Figure 1:
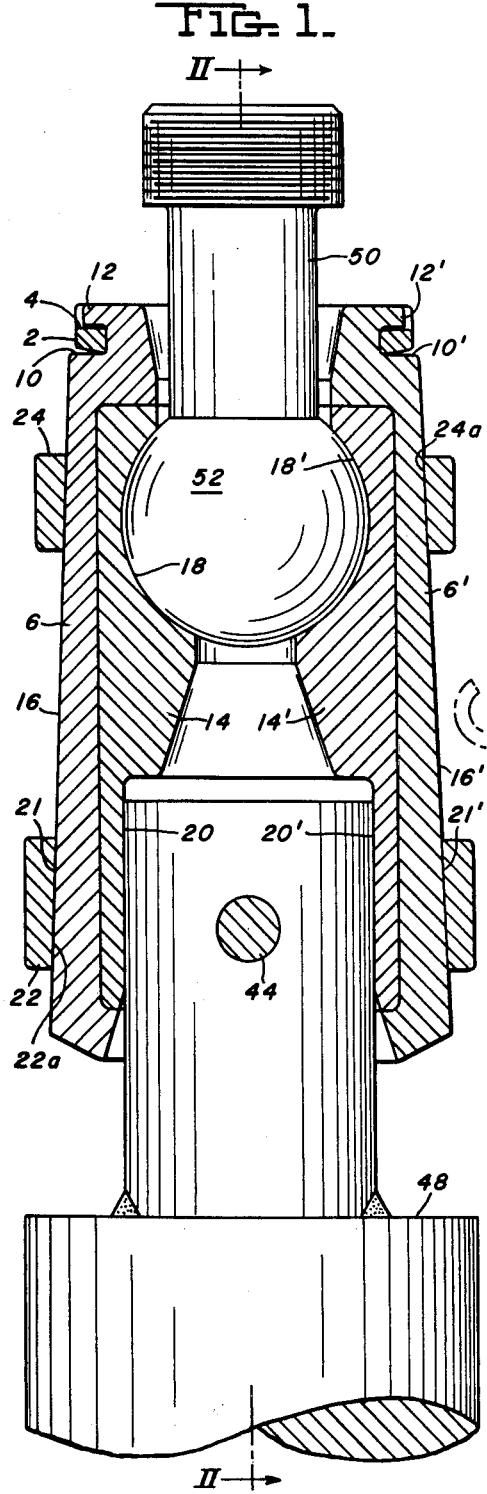

June 1, 1965 G. PESTEL 3,187,079
ELECTRODE CLAMP
Filed Nov. 8, 1962

INVENTOR.
GUENTER PESTEL
By John W. Linkhauer
Agent 3,187,079
ELECTRODE CLAMP
Guenter Pestel, Syracuse, N.Y., assignor to Crucible Steel Company of America, Pittsburgh, Pa., a corporation of New Jersey
Filed Nov. 8, 1962, Ser. No. 236,303
13 Claims. (Cl. 13—15)

The present invention relates to a holder for an electrode in a consumable-electrode vacuum arc remelting apparatus, and in particular, to a holder of the type above-mentioned which embodies or contains certain novel features which, singly or in combination, impart advantages over the electrode-holder structures hitherto known and used.

In one type of known electrode holder, the electrode or an adapter welded to its top is received within a structure that comprises a number of copper toggles. The toggles are pivoted at one end remote from the adapter or electrode, and the other end of the toggles falls into self-locking engagement with the electrode or adapter when the holder is raised to support the weight of the electrode. Apparatus of this kind is disadvantageous for several reasons. First, with a holder of this kind, it is impossible to do furnace welding of one electrode to another, since it is ordinarily necessary to apply pressure to bring the old electrode stump and the new electrode together; if such pressure were applied with apparatus of the kind described above, the copper toggles would unlock. Second, apparatus of the type described above is disadvantageous because the copper toggles will unlock and the clamp will disengage if the electrode touches the bottom of the mold. If this occurs under load, such as when striking an arc, arcing will take place inside the clamp and the contacts through which electric current is fed to the electrode will be burnt. This necessitates the use of extra precautionary measures, such as the use of steel wool padding, to avoid having the electrode strike the bottom of the mold. Accordingly, it is an object of the invention to provide a non-self-locking electrode-holder structure, whereby the above-mentioned difficulties and disadvantages may be avoided.

A second disadvantage of known electrode holders is that they provide a relatively small contact area between the toggles and adapter or electrode. In consumable-electrode vacuum arc remelting, relatively high electrical currents, such as about 17,500 amps. at about 40 volts, are customarily used. When such high melting currents are used the toggles and heater become warm as a result of the current passing therethrough. Despite the customary use of such light melting currents, it has nevertheless been customary to use copper-alloy toggles of relatively small contact area, since high-conductivity copper alloy must be used if the heating effect mentioned above is not to become overly pronounced. Moreover, such high-conductivity copper alloys usually have a relatively low hardness, and must therefore be replaced rather frequently, at considerable expense. Accordingly, it is an object of the present invention to provide a structure wherein the contact area is relatively large, and as a result the above-mentioned heating effect and wear necessitating frequent replacement are advantageously avoided.

In consumable-electrode vacuum arc remelting, it is important that the electrode be well centered in the mold, since otherwise stray arcing may occur between the electrode and the mold wall. With prior-art electrode holders, readjusting the position of the electrode to center it has been inconvenient. Accordingly, it is an object of the present invention to provide an electrode holder that makes possible the rapid and convenient readjustment of the position of the electrode to center it in the mold.

Prior-art electrode holders have the further disadvantage that they are constructed in such a manner that it is difficult for the operator to see the top of the electrode during melting. As a result, the operator may stop the melting too soon, which results in a lower yield of metal and inefficient operation, or the operator may continue the melting too long, which may result in contamination of the remelted metal with the metal comprising the adapter. Accordingly, it is a further object of the present invention to provide an electrode holder having a diameter smaller than the diameter of the electrode, whereby good visibility of the upper end of the electrode during melting is obtained and difficulties of the kind mentioned above are wholly avoided.

Another object of the invention is to provide an electrode holder that can be conveniently and quickly disassembled for cleaning or repair.

Still another object of the invention is to provide an electrode holder wherein members grasping the electrode are held in non-tangent relationship with one another and as a result a saving in the amount of material needed to construct the electrode holder results.

A further object of the invention is to provide an electrode holder having removable interior liner portions, whereby such portions, which are subject to wear during use, may be replaced instead of replacing the entire member gripping said electrode, so that a reduction in operating expense is obtained.

Figure 2:
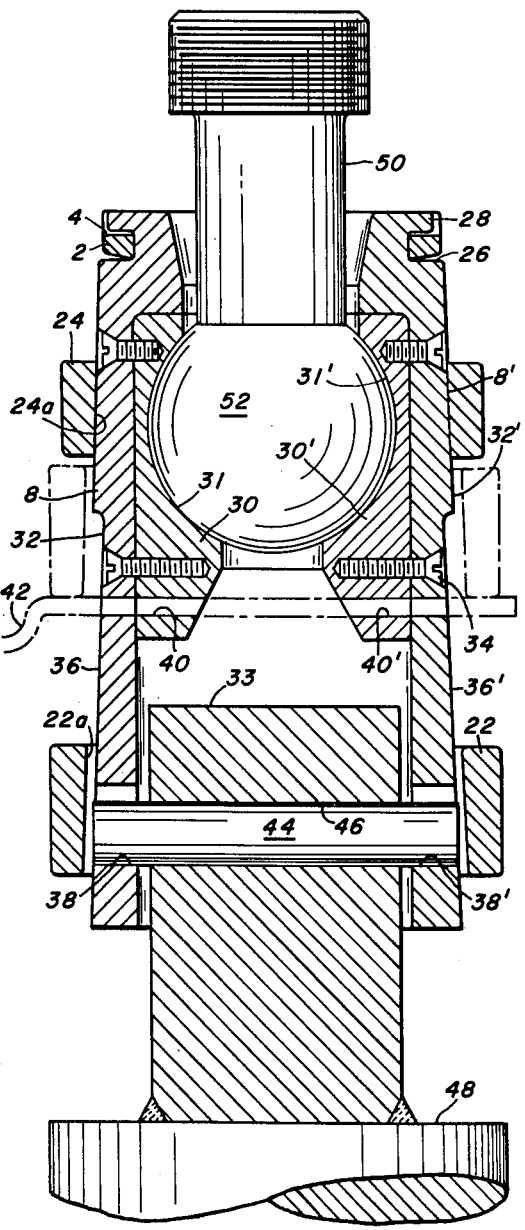

These and other objects of the invention will be more apparent from the following detailed description of the invention, taken together with the appended drawings, in which:

FIGURE 1 is a central elevational sectional view through a holder comprising one embodiment of the present invention; and FIGURE 2 is an elevational sectional view, taken on the line II—II of FIGURE 1.

Referring now to the drawings, and more particularly to FIGURE 1, the apparatus of the present invention comprises a guide ring 2 having four notches 4 cut therein, for a purpose to be hereinafter described. Making up the body of the electrode holder are two opposed gripper members 6 and 6' and two opposed hanger members 8 and 8'. Near their respective tops the gripper members 6 and 6' are provided with recesses 10 and 10' adapted to receive the guide ring 2. Lugs 12 and 12' fit with the notches 4 of guide ring 2 and assure against laterial displacement of the gripper members 6 and 6'. The grippers 6 and 6' are provided with removable interior liner portions 14 and 14' that are secured to their exterior portions 16 and 16' by means of screws or other suitable fasteners (not shown). The liners 14 and 14' present, near one of their respective ends, interior surfaces 18 and 18' comprising a part of a sphere, for a purpose hereinafter to be described. Near their other respective ends, the interior liners 14 and 14' present surfaces 20 and 20' that comprise parts of a cylinder, for a purpose to be hereinafter described. The outer surfaces of the exterior portion 16 and 16' of gripper members 6 and 6' are tapered outwardly at a small angle, for example about three degrees, for a purpose to be hereinafter explained.

The apparatus of the invention further comprises a first lock ring 22 and a second lock ring 24. These lock rings are of generally cylindrical form and are provided with interior surfaces 22a and 24a, respectively, that are tapered to correspond with the exterior surface 21 and 21' of the gripper members 6 and 6'. It will be noted that the second lock ring 24 is of smaller diameter than the first lock ring 22; accordingly, it is adapted to engage the surfaces 21 and 21' near the smaller end of the structure that comprises the guide ring 2, the gripper members 6 and 6', and the hanger members 8 and 8' to be more fully described hereinbelow.

The hanger members 8 and 8' are generally similar in form to the gripper members 6 and 6' hereinabove described. For example, each hanger member 8 and 8' also has a notch or recess 26 and a lug 28 corresponding to the notch 10 and lug 12 of the gripper member 6 and 6' for the same purposes. Also the hanger members 8 and 8' are provided with removable interior liner portions 30 and 30', secured to their exterior portions 32 and 32' by suitable fasteners, such as screws 34. The removable interior liner portions 30 and 30' of the hanger members 8 and 8' are also shaped to provide interior surfaces 31 and 31' that, like the surfaces 18 and 18', are shaped to provide a portion of a sphere, for a purpose to be hereinafter more fully explained. The interior removable liner portions 30 and 30' are, however, different from portions 14 and 14' in that the former terminate at about the middle of the electrode-holder structure, whereas the latter extend substantially throughout its length. The liners 30 and 30' are terminated at about the middle of the structure to avoid contact with the adapter 33, the purpose and structure of which is explained hereinbelow.

The hanger members 8 and 8' differ from the gripper members 6 and 6', however, in certain respects. First, each hanger member has a lower portion of reduced exterior diameter 36 and 36'. Openings or apertures 38 and 38' are provided in the reduced-diameter portions 36 and 36' of hangers 8 and 8'. In their central portions, the hanger members 8 and 8' are provided with additional openings 40 and 40', to permit the passage of an eye pin 42, which serves the purpose explained below.

For use with my invention, I also provide a removable pin 44; this passes through an opening 46 extending completely through the adapter 33. Adapter 33 is of generally cylindrical form and is welded at its lower end to the electrode 48 to be remelted. Electrodes of different size and shape may be used with the holder of the present invention, provided that always an adapter 33 of suitable dimensions is welded to the electrode. The adapter 33 has exterior dimensions such that it is snugly received within the surfaces 20 and 20' of the gripper members 6 and 6'.

In accordance with the invention, I also provide a shaft member 50 that has at one end a ball 52 adapted to mate with the surfaces 18, 18', 31 and 31' to form a ball-and-socket joint. For best results, the exterior of ball 52 is given a thin coating of hard-facing material, such as hard chromium. At the other end of shaft 50 is a portion threadedly engageable with a stinger rod for raising and lowering the electrode and electrode holder. This stinger rod serves to carry current for the remelting of the electode to the shaft 50. The current passes from its source to the stinger rod and thence through shaft 50, through ball 52, through the gripper member 6, through the adapter 33, to the electrode 48, and across the arc to the ingot, to the fluid-cooled mold with which it is in contact, and from there to the above-mentioned current source.

Desirably, the stinger rod, shaft 50, and ball 52 are made of zirconium copper or other suitable alloy possessing high conductivity and high strength. Desirably, gripper liners 14 and 14' are made of pure copper. The other parts may be made of any suitable material, such as steel.

In the embodiment of the invention described above, the joint between the shaft 50 and the electrode holder is one of substantial contact area, to avoid danger of arcing, burning, or undue heating, and is desirably, although not necessarily, of the ball-and-socket type, to permit easy adjustment of the position of the electrode in respect to the mold wall. Moreover, the structure described is compact, and for best results is sized so that its exterior diameter in the vicinity of its base is substantially less than (for example, not more than about ⅞ of) the diameter of the electrode to be melted, as a result of which the electrode holder does not impede the operator's view of the melting operation. As indicated above, this is advantageous because it makes it possible for the operator to determine more readily the proper time for discontinuing melting.

The invention is further advantageous when it is considered that in the steel industry the electrodes that are to be remelted are about 9 to 17 inches or more in diameter and several yards in length, weighing about 1 to 5 tons or more. The apparatus of my invention, in contrast with others hitherto used for the purpose, combines in one structure separate means for supporting the weight of the electrode and means for gripping the electrode and conducting current to it. Thus, the invention affords the advantages of having a current path of high-conductivity alloy such as copper leading to the electrode, without the disadvantage of the undue wear of the relatively soft high-conductivity alloy that is encountered when the current-carrying and weight-supporting functions are not separated.

The structure described above is assembled and used in the manner described below. Suitable electrically conductive lubrication, such as a fast-drying suspension of graphite in alcohol, is applied to the exterior surface of the ball 52. The surfaces 16, 16' and/or surfaces 21, 21' are also lubricated, e.g., with molybdenum disulfide. Then, apart from the furnace, the gripper members 6 and 6', hanger members 8 and 8' are nested around the ball 52, with the interior surfaces 18, 18', 31 and 31' of the gripper and hanger members in contact with the ball. The gripper and hanger members are then manipulated to bring their lugs 12, 12', 28 and 28' within the notches 4 in the guide ring 2. The first lock ring 22 and the second lock ring 24 are loosely slipped over this assembly, which is then carried to the furnace and threaded to the stinger rod of the furnace by means of the threads on the portion of shaft 50 remote from ball 52. The first lock ring 22 is then raised to the position indicated in FIGURE 2, and eye pin 42 is inserted through hole 40 to hold the first lock ring 22 in position. The electrode 48, having adapter 33 with hole 46 therein welded thereto, is brought to the furnace and inserted in the holder structure so that the hole 46 registers with the openings 38 and 38' in the portions 36 and 36' of the hanger members 8 and 8'. The removable pin 44 is then inserted through said openings 38, 46 and 38'. The electrode 48 is then adjusted to center it in the mold, and the second lock ring 24 is urged downwardly to hold the electrode in the desired position. The eye pin 42 is then removed, and the first lock ring 22 drops to a position at which it can insure against inadvertent removal or displacement of the pin 44. It will be noted that the pin 22 comes to rest against the tapered exterior surface 21 of the gripper members 6 and 6' but does not touch the hanger members 8 and 8'.

In day-to-day use of the electrode holder of the present invention, it is not ordinarily necessary to assemble the electrode holder from its component parts, but only to manipulate them so as to change electrodes. This may be done as follows: The second lock ring 24 is loosened by tapping it upwardly with a hammer. The first lock ring 22 is raised to the position indicated in FIGURE 2. Eye pin 42 is inserted to hold ring 22 in position. Pin 44 is removed. The electrode 48 is removed from the holder and a new electrode 48 having an adapter 33 is inserted therein, in such manner that the hole 46 in the adapter 33 registers with the openings 38 and 38' in the parts 36 and 36' of the hanger member 8 and 8'. The pin 44 is reinserted. The new electrode 48 is positioned properly in the mold, whereupon the second lock ring 24 is tightened, eye pin 42 is removed, and first lock ring 22 is returned to its position in the vicinity of the openings 38 and 38' in the hanger members 8 and 8'. The holder now contains a new electrode, ready for remelting.

While I have shown and described above one particular embodiment of the invention, it is also to be understood that the invention comprehends such obvious modifica-

I claim:

1. A holder for a metal electrode in consumable-electrode vacuum arc remelting apparatus, said holder comprising, in combination, a pair of opposed gripper members, a pair of opposed hanger members, said gripper and hanger members being assembled to form a structure presenting an exterior face tapered from a first portion of predetermined cross section to another portion of cross section substantially greater than said cross section of said first portion, said gripper and hanger members having interior portions shaped in the vicinity of one of their respective ends to form a joint of substantial contact area and in the vicinity of the other of the respective ends to receive snugly a member of predetermined dimensions, said hanger members having opposed openings therein, a first lock piece having effective interior dimensions substantially the same as the exterior dimensions of the said structure in the vicinity of said openings, a second lock piece having effective interior dimensions larger than the exterior dimensions of said structure at its said first end but smaller than the effective interior dimensions of said first lock piece, an axially movable shaft having at one extremity a portion adapted to cooperate with said interior portions of said gripper and hanger members to form said joint, an adapter welded to the top of said electrode and having an aperture registrable with said openings, and a removable pin adapted to be received in said openings.

2. A holder for a metal electrode in consumable-electrode vacuum arc remelting apparatus, said holder comprising, in combination, a pair of opposed gripper members, a pair of opposed hanger members, a guide piece whereon said gripper members and said hanger members are mounted in non-tangent relationship with one another, said gripper and hanger members being assembled with said guide piece to form a structure presenting an exterior face tapered from a first portion of predetermined cross section to another portion of cross section substantially greater than said cross section of said first portion, said gripper and hanger members having interior portions shaped in the vicinity of one of their respective ends to form a joint of substantial contact area and in the vicinity of the other of their respective ends to receive snugly a member of predetermined dimensions, said hanger members having opposed openings therein, a first lock piece having effective interior dimensions substantially the same as the exterior dimensions of the said structure in the vicinity of said openings, a second lock piece having effective interior dimensions larger than the exterior dimensions of said structure at its said first end but smaller than the effective interior dimensions of said first lock piece, an axially movable shaft having at one extremity a portion adapted to cooperate with said interior portions of said gripper and hanger members to form said joint, an adapter welded to the top of said electrode and having an aperture registrable with said openings, and a removable pin adapted to be received in said openings.

3. A holder for a metal electrode in consumable-electrode vacuum arc remelting apparatus, said holder comprising, in combination, a pair of opposed gripper members, a pair of opposed hanger members, a guide ring whereon said gripper members and said hanger members are mounted in non-tangent relationship with one another, said gripper and hanger members being assembled with said guide piece to form a substantially frustoconical structure presenting an exterior face tapered from a first portion of predetermined diameter to another portion of diameter substantially greater than said diameter of said first portion, said gripper and hanger members having interior portions shaped in the vicinity of one of their respective ends to form a joint of substantial contact area and in the vicinity of the other of their respective ends to receive snugly a member of predetermined dimensions, said hanger members having opposed openings therein, a first lock ring having an effective interior diameter substantially the same as the exterior diameter of the said structure in the vicinity of said openings, a second lock ring having an effective interior diameter larger than the exterior diameter of said structure at its said first end but smaller than the effective interior diameter of said first lock piece, an axially movable shaft having at one extremity a portion adapted to cooperate with said interior portions of said gripper and hanger members to form said joint, an adapter welded to the top of said electrode and having an aperture registrable with said openings, and a removable pin adapted to be received in said openings.

4. A holder for a metal electrode in consumable-electrode vacuum arc remelting apparatus, said holder comprising, in combination, a pair of opposed gripper members, a pair of opposed hanger members, a guide piece whereon said gripper members and said hanger members are mounted in nontangent relationship with one another, said gripper and hanger members being assembled with said guide piece to form a structure presenting an exterior face tapered from a first portion of predetermined cross section to another portion of cross section substantially greater than said cross section of said first portion, said gripper and hanger members having removable interior liner portions, said liner portions being shaped in the vicinity of one of their respective ends to form a joint of substantial contact area and in the vicinity of the other of their respective ends to receive snugly a member of predetermined dimensions, said hanger members having opposed openings therein, a first lock piece having effective interior dimensions substantially the same as the exterior dimensions of the said structure in the vicinity of said openings, a second lock piece having effective interior dimensions larger than the exterior dimensions of said structure at its said first end but smaller than the effective interior dimensions of said first lock piece, an axially movable shaft having at one extremity a portion adapted to cooperate with said interior portions of said gripper and hanger members to form said joint, an adapter welded to the top of said electrode and having an aperture registrable with said openings, and a removable pin adapted to be received in said openings.

5. A holder for a metal electrode in consumable-electrode vacuum arc remelting apparatus, said holder comprising, in combination, a pair of opposed gripper members, a pair of opposed hanger members, a guide ring whereon said gripper members and said hanger members are mounted in nontangent relationship with one another, said gripper and hanger members being assembled with said guide piece to form a substantially frustoconical structure presenting an exterior face tapered from a first portion of predetermined diameter to another portion of diameter substantially greater than said cross diameter of said first portion, said gripper and hanger members having removable interior liner portions, said liner portions being shaped in the vicinity of one of their respective ends to form a joint of substantial contact area and in the vicinity of the other of their respective ends to receive snugly a member of predetermined dimensions, said hanger members having opposed openings therein, a first lock ring having an effective interior diameter substantially the same as the exterior diameter of the said structure in the vicinity of said openings, a second lock ring having an effective interior diameter larger than the exterior diameter of said structure at its first end but smaller than the effective interior diameter of said first lock ring, an axially movable shaft having at one extremity a portion adapted to cooperate with said removable interior liner portions of said gripper and hanger members to form said joint, an adapter welded to the top of said electrode and having an aperture registrable with said openings, and a removable pin adapted to be received in said openings.

6. A holder for a metal electrode in consumable-electrode vacuum arc remelting apparatus, said holder comprising, in combination, a pair of opposed gripper members, a pair of opposed hanger members, a guide piece whereon said gripper members and said hanger members are mounted in nontangent relationship with one another, said gripper and hanger members being assembled with said guide piece to form a structure presenting an exterior face tapered from one portion of predetermined cross section to another portion of cross section substantially greater than said cross section of said one portion, said grippers and hangers having interior portions shaped in the vicinity of one of their respective ends to form the socket of a ball-and-socket joint and in the vicinity of the other of their respective ends to receive snugly a member of predetermined dimensions, said hanger members having opposed openings therein, a first lock piece having effective interior dimensions substantially the same as the exterior dimensions of the said structure in the vicinity of said openings, a second lock piece having effective interior dimensions larger than the exterior dimensions of said structure at its said first end but smaller than the effective interior dimensions of said first lock piece, an axially movable shaft having at one extremity a ball adapted to be received in said socket and cooperate with said socket to form said joint, an adapter welded to the top of said electrode and having an aperture registrable with said openings, and a removable pin adapted to be received in said openings.

7. A holder for a metal electrode in consumable-electrode vacuum arc remelting apparatus, said holder comprising, in combination, a pair of opposed gripper members, a pair of opposed hanger members, a guide ring whereon said gripper members and said hanger members are mounted in nontangent relationship with one another, said gripper and hanger members being assembled with said guide ring to form a structure presenting an exterior face tapered from a first portion of predetermined cross section to another portion of cross section substantially greater than said cross section of said first portion, said gripper and hanger members having interior portions shaped in the vicinity of one of their respective ends to form the socket of a ball-and-socket joint and in the vicinity of the other of their respective ends to receive snugly a member of predetermined dimensions, said hanger members having opposed openings therein, a first lock piece having effective interior dimensions substantially the same as the interior dimensions of the said structure in the vicinity of said openings, a second lock piece having effective interior dimensions larger than the exterior dimensions of said structure at its said first end but smaller than the effective interior dimensions of said first lock piece, an axially movable shaft having at one extremity a ball adapted to be received in said socket and cooperate with said socket to form said joint, an adapter welded to the top of said electrode and having an aperture registrable with said openings, and a removable pin adapted to be received in said openings.

8. A holder for a metal electrode in consumable-electrode vacuum arc remelting apparatus, said holder comprising, in combination, a pair of opposed gripper members, a pair of opposed hanger members, a guide piece whereon said gripper members and said hanger members are mounted in non-tangent relationship with one another, said gripper and hanger members being assembled with said guide ring to form a structure presenting an exterior face tapered from a first portion of predetermined cross section to another portion of cross section substantially greater than said cross section of said first portion, said gripper and hanger members having removable interior liner portions shaped in the vicinity of one of their respective ends to form the socket of a ball-and-socket joint and in the vicinity of the other of their respective ends to receive snugly a member of predetermined dimensions, said hanger members having opposed openings therein, a first lock piece having effective interior dimensions substantially the same as the exterior dimensions of the said structure in the vicinity of said openings, a second lock piece having effective interior dimensions larger than the exterior dimensions of said structure at its said first end but smaller than the effective interior dimensions of said first lock piece, an axially movable shaft having at one extremity a ball adapted to be received in socket to cooperate with said socket to form said joint, an adapter welded to the top of said electrode and having an aperture registrable with said openings, and a removable pin adapted to be received in said openings.

9. A holder for a metal electrode in consumable-electrode vacuum arc remelting apparatus, said holder comprising, in combination, a pair of opposed gripper members, a pair of opposed hanger members, a guide ring whereon said gripper members and said hanger members are mounted in nontangent relationship with one another, said gripper and hanger members being assembled with said guide ring to form a structure presenting an exterior face tapered from a first portion of predetermined cross section to another portion of cross section substantially greater than said cross section of said first portion, said gripper and hanger members having removable interior liner portions shaped in the vicinity of one of their respective ends to form the socket of a ball-and-socket joint and in the vicinity of the other of their respective ends to receive snugly a member of predetermined dimensions, said hanger members having opposed openings therein, a first lock piece having effective interior dimensions substantially the same as the exterior dimensions of the said structure in the vicinity of said openings, a second lock piece having effective interior dimensions larger than the exterior dimensions of said structure at its said first end but smaller than the effective interior dimensions of said first lock piece, an axially movable shaft having at one extremity a portion adapted to cooperate with said interior portions of said gripper and hanger members to form said joint, an adapter welded to the top of said electrode and having an aperture registrable with said openings, and a removable pin adapted to be received in said openings.

10. In apparatus for supporting and conducting an electrical current of the order of 17,500 amperes at about 34 volts to a metal electrode in a consumable-electrode vacuum arc remelting furnace, said electrode having affixed to one portion thereof an adapter of predetermined dimensions, said adapter having an opening therein that extends completely therethrough, the combination therewith of a holder for said electrode comprising, in combination, a pair of opposed gripper members, a pair of opposed hanger members, said gripper and hanger members being assembled to form a structure presenting an exterior face tapered from a first portion of predetermined cross section to another portion of cross section substantially greater than said cross section of said first portion, said gripper and hanger members having interior portions shaped in the vicinity of one of their respective ends to form a joint of substantial contact area and in the vicinity of the other of their respective ends to receive snugly a member of predetermined dimensions, said hanger members having opposed openings therein, a first lock piece having effective interior dimensions substantially the same as the exterior dimensions of the said structure in the vicinity of said openings, a second lock piece having effective interior dimensions larger than the exterior dimensions of said structure at its said first end but smaller than the effective interior dimensions of said first lock piece, an axially movable shaft having at one extremity a portion adapted to cooperate with said interior portions of said gripper and hanger members to form said joint, and a removable pin adapted to be received in said opening in said adapter and in said openings in said hanger members.

11. In apparatus for supporting and conducting the electrical current of the order of 17,500 amperes at about 40 volts to a metal electrode in a consumable-electrode vacuum arc remelting furnace, said electrode having affixed to one portion thereof an adapter of predetermined dimensions, said adapter having an opening therein that extends completely therethrough, the combination therewith of a holder for said electrode comprising, in combination, a pair of opposed gripper members, a pair of opposed hanger members, a guide piece whereon said gripper members and said hanger members are mounted in non-tangent relationship with one another, said gripper and hanger members being assembled with said guide piece to form a structure presenting an exterior face tapered from a first portion of predetermined cross section to another portion of cross section substantially greater than said cross section of said first portion, said gripper and hanger members having interior portions shaped in the vicinity of one of their respective ends to form a joint of substantial contact area and in the vicinity of the other of their respective ends to receive snugly a member of predetermined dimensions, said hanger members having opposed openings therein, a first lock piece having effective interior dimensions substantially the same as the exterior dimensions of the said structure in the vicinity of said openings, a second lock piece having effective interior dimensions larger than the exterior dimensions of said structure at its said first end but smaller than the effective interior dimensions of said first lock piece, an axially movable shaft having at one extremity a portion adapted to cooperate with said interior portion of said gripper and hanger members to form said joint, and a removable pin adapted to be received in said opening in said adapter and in said openings in said pair of hanger members.

12. In apparatus for supporting and conducting an electrical current of the order of 17,500 amperes at about 40 volts to a metal electrode in a consumable-electrode vacuum arc remelting furnace, said electrode having affixed to one portion thereof an adapter of predetermined dimensions, said adapter having an opening therein that extends completely therethrough, the combination therewith of a holder for said electrode comprising, in combination,
  a pair of opposed gripper members,
  a pair of opposed hanger members,
  said gripper and hanger members being assembled to form a generally frustoconical structure having a maximum diameter substantially less than the minimum radial cross sectional dimension of said electrode and presenting an exterior face tapered from a first end of a predetermined cross section to a second end of cross section substantially greater than said cross section of said first end, said structure having a diameter substantially less than that of said electrode,
said grippers and hangers having first and second ends corresponding to said first and second ends of said structure and having removable interior liners shaped in the vicinity of one of their respective said first ends to form the socket of a ball-and-socket joint and in the vicinity of the other of their respective ends to receive snugly a generally cylindrical member of predetermined diameter,
  said hanger members having opposed openings therein,
  a first lock ring having an effective diameter substantially the same as the exterior diameter of the said structure in the vicinity of said openings,
  a second lock ring having an effective interior diameter larger than the exterior diameter of said structure at its one end but substantially smaller than the effective interior diameter of said first lock ring,
  an axially movable shaft having at one extremity a ball adapted to be received snugly in said socket, and a removable pin adapted to be received in said opening in said adapter and in said openings in said pair of opposed members having opposed openings therein.

13. The combination of apparatus as defined in claim 12, said combination further comprising additional opposed openings in said hanger members, said additional openings being spaced from said other openings in the direction of said first end of said hanger members, and an eye pin receivable in said additional opposed openings to hold said first lock ring above the vicinity of said pin passing through said adapter during insertion and removal of said last-mentioned pin.

References Cited by the Examiner
UNITED STATES PATENTS

| 1,667,485 | 4/28 | Macdonald | 339—273 |
| 2,805,270 | 9/57 | Boron et al. | 13—15 |

RICHARD M. WOOD, *Primary Examiner.*
JOSEPH V. TRUHE, *Examiner.*

UNITED STATES PATENT OFFICE
CERTIFICATE OF CORRECTION

Patent No. 3,187,079 June 1, 1965

Guenter Pestel

It is hereby certified that error appears in the above numbered patent requiring correction and that the said Letters Patent should read as corrected below.

Column 1, line 51, for "light" read -- high --; column 2, line 45, for "laterial" read -- lateral --; column 4, line 66, for "member" read -- members --; column 6, line 51, column 7, lines 8 and 37 and column 8, line 21, for "nontangent", each occurrence, read -- non-tangent --; column 7, line 50, for "interior" read -- exterior --; column 9, line 33, for "portion" read -- portions --.

Signed and sealed this 26th day of October 1965.

(SEAL)
Attest:

ERNEST W. SWIDER
Attesting Officer

EDWARD J. BRENNER
Commissioner of Patents